(12) United States Patent
Ishikawa et al.

(10) Patent No.: US 7,631,892 B2
(45) Date of Patent: Dec. 15, 2009

(54) AIRBAG, AIRBAG FOLDING METHOD, AND AIRBAG DEVICE

(75) Inventors: Katsumi Ishikawa, Shizuoka (JP); Norimasa Goto, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 491 days.

(21) Appl. No.: 11/065,106

(22) Filed: Feb. 25, 2005

(65) Prior Publication Data
US 2005/0206141 A1 Sep. 22, 2005

(30) Foreign Application Priority Data
Feb. 26, 2004 (JP) .............................. 2004-051333

(51) Int. Cl.
*B60R 21/237* (2006.01)
(52) U.S. Cl. .................. 280/743.1; 280/731; 280/728.1
(58) Field of Classification Search .............. 280/743.1, 280/731, 728.1, 728.2
See application file for complete search history.

(56) References Cited

U.S. PATENT DOCUMENTS

| 5,865,466 | A  | * | 2/1999  | Yamamoto et al. | ....... 280/743.1 |
| 5,884,939 | A  | * | 3/1999  | Yamaji et al.   | ............ 280/743.1 |
| 6,092,839 | A  | * | 7/2000  | Nagano          | .................... 280/743.1 |
| 6,149,568 | A  | * | 11/2000 | Ross et al.     | .................... 493/458 |
| 6,547,709 | B1 | * | 4/2003  | Dennis          | ........................ 493/405 |
| 6,557,891 | B2 | * | 5/2003  | Okada et al.    | ............. 280/743.1 |
| 7,083,186 | B2 | * | 8/2006  | Lutz et al.     | ................. 280/728.3 |
| 2001/0038196 | A1 | * | 11/2001 | Yamamoto et al. | ....... 280/728.3 |
| 2002/0047254 | A1 | * | 4/2002  | Okada et al.    | ........... 280/743.1 |
| 2002/0084635 | A1 | * | 7/2002  | Tajima et al.   | ................ 280/732 |
| 2002/0145272 | A1 | * | 10/2002 | Okamoto et al.  | ............ 280/732 |
| 2003/0006595 | A1 | * | 1/2003  | Ozaki et al.    | ................. 280/740 |
| 2004/0160048 | A1 | * | 8/2004  | Hasebe et al.   | ............. 280/743.1 |
| 2006/0006633 | A1 | * | 1/2006  | Bito            | ........................... 280/740 |
| 2006/0049618 | A1 | * | 3/2006  | Bito            | ........................... 280/732 |
| 2006/0055156 | A1 | * | 3/2006  | Okada et al.    | ................. 280/731 |

FOREIGN PATENT DOCUMENTS

| JP | 2000-38107 A  | 2/2000 |
| JP | 2002-316605 A | 10/2002 |

* cited by examiner

*Primary Examiner*—Paul N. Dickson
*Assistant Examiner*—Timothy Wilhelm
(74) *Attorney, Agent, or Firm*—Sughrue Mion, PLLC

(57) ABSTRACT

An airbag is disclosed wherein a lower deployment portion, right deployment portion, and left deployment portion are folded on the occupant side of a central deployment portion in an optional order. The upper deployment portion is folded to be located on the most occupant side and upper side of the folded deployment portions.

5 Claims, 9 Drawing Sheets

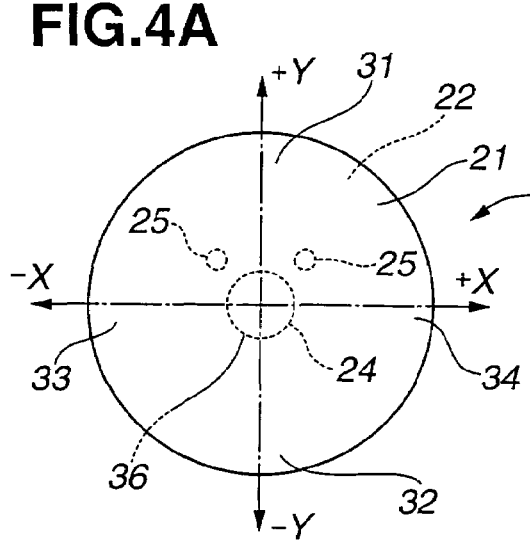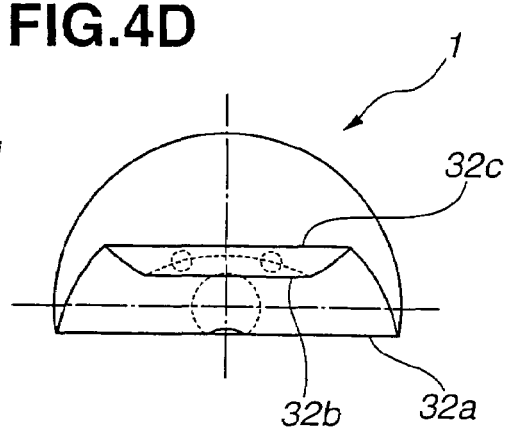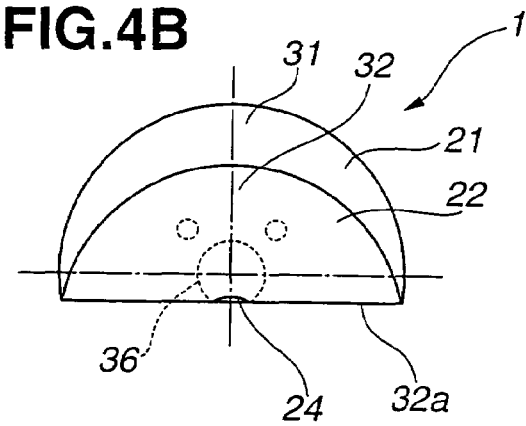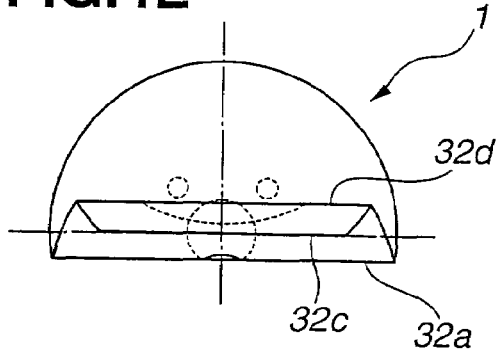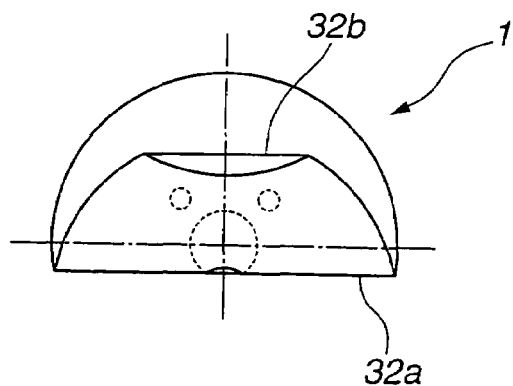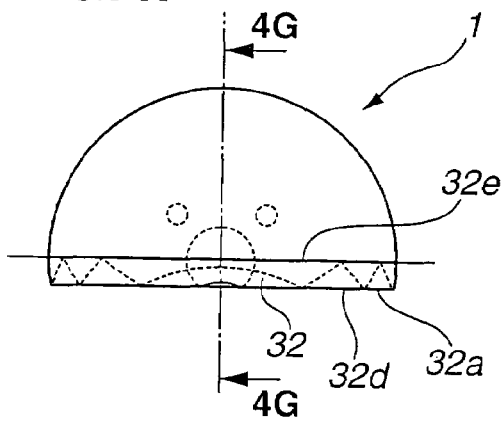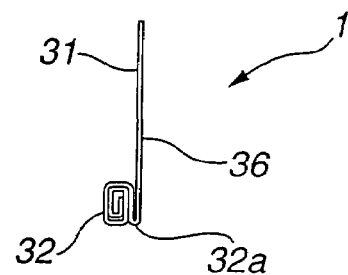

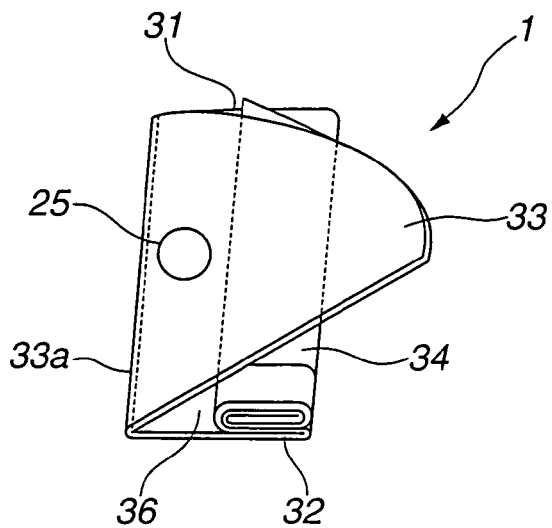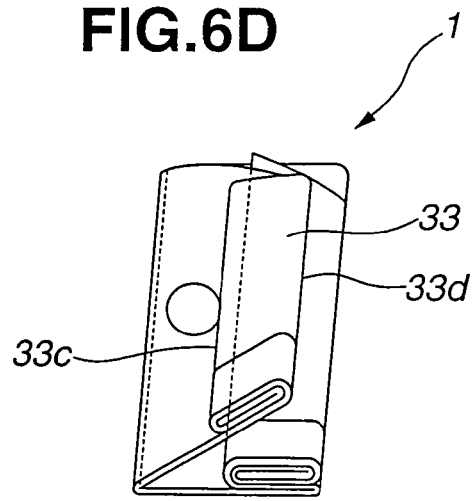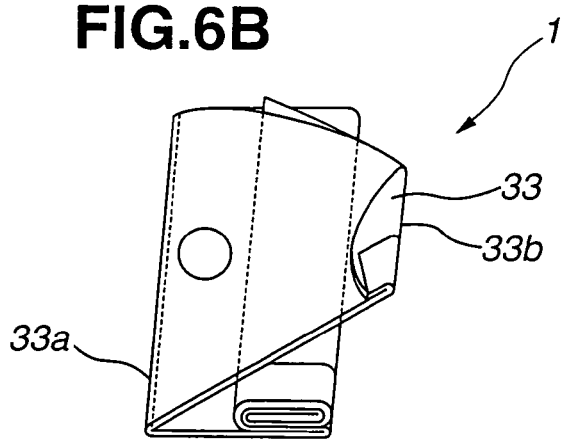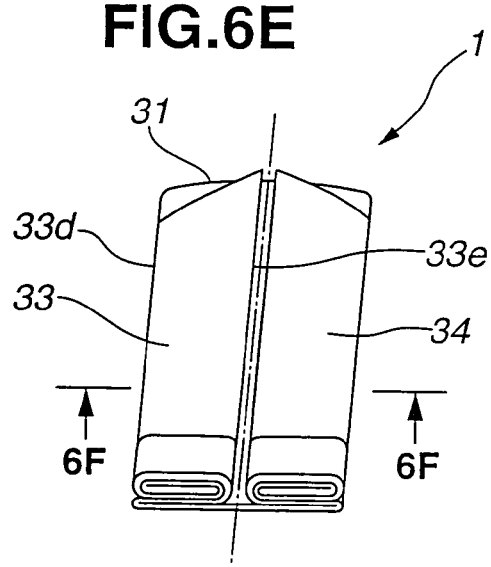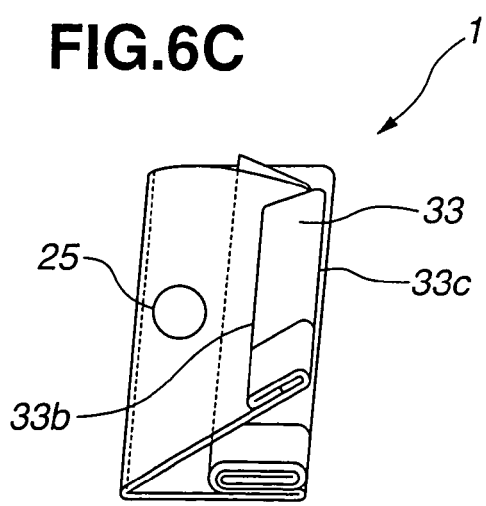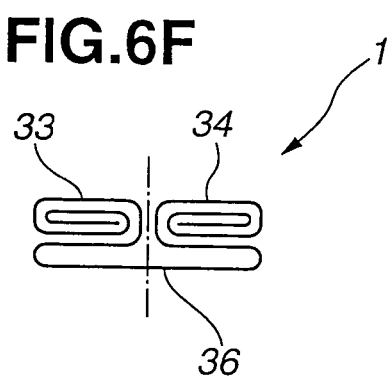

AIRBAG, AIRBAG FOLDING METHOD, AND AIRBAG DEVICE

BACKGROUND OF THE INVENTION

The present invention relates to an airbag which expands and deploys by gas introduced therein, an airbag folding method, and an airbag device.

It has been used an airbag device mounted, for example, to a steering wheel of a motor vehicle. The airbag device comprises an airbag, an inflator for supplying gas to the airbag, and a cover for covering the airbag accommodated in the folded state. Various airbag folding methods have been proposed to achieve a reduction in manufacturing cost and an enhancement in deployment characteristic.

In order to enhance the deployment characteristic of the airbag mounted to the steering wheel, the airbag is obtained, for example, by superimposing circular base cloths one upon another, wherein the airbag includes an upper deployment portion corresponding to the head of an occupant or passenger and a lower deployment portion. With such airbag, a deployment section of the folded upper deployment portion located on the occupant side from side to side is folded, and then the lower deployment portion is folded on the occupant side of the deployment section. With this structure, when the airbag device is actuated, the lower deployment portion starts to expand and deploy toward a space corresponding to the occupant s chest and abdomen at the initial stage of airbag deployment, allowing the airbag to largely deploy toward the space before the occupant inclines forward. After the lower deployment portion deploys, the upper deployment portion and the like expand and deploy subsequently to restrain the occupant s head.

In this respect, in connection with the positional relationship between the automotive seat and the steering wheel and the like, the airbag device may be required to quickly deploy toward the occupant s head.

Moreover, in order to suitably restrain the occupant even if he/she is seated close to the steering wheel, the cover of the airbag device mounted to the steering wheel may comprise a lower lid rotating downward and an upper lid rotating upward, wherein the upper lid is divided into right and left portions. With this structure, even if the occupant is seated close to the steering wheel, the right and left portions of the upper lid deploy compactly without interfering with the occupants face, and rotate frontward of a rim without interfering therewith. Thus, when the occupant is seated close to the steering wheel, the airbag expanding from the cover deploys frontward from the inside of a rim portion of the airbag to reduce the pressure to be applied to the occupant, allowing appropriate restraint of the occupant.

In this respect, the airbag device is required to provide more appropriate and favorable deployment characteristic.

SUMMARY OF THE INVENTION

It is, therefore, an object of the present invention to provide an airbag which allows easy achievement of an appropriate deployment characteristic, an airbag folding method, and an airbag device.

Generally, the present invention provides an airbag, which comprises: an upper deployment portion corresponding to a head of an occupant; a lower deployment portion corresponding to a body of the occupant below the head; a right deployment portion located on the right of the upper and lower deployment portions; a left deployment portion located on the left of the upper and lower deployment portions; and a central deployment portion located between the upper, lower, right, and left deployment portions, the lower deployment portion, the right deployment portion, and the left deployment portion being folded on the occupant side of the central deployment portion in an optional order, the upper deployment portion being folded to be located on the most occupant side and upper side of the folded deployment portions.

One aspect of the present invention lies in a method of folding an airbag including an upper deployment portion corresponding to a head of an occupant, a lower deployment portion corresponding to a body of the occupant below the head, a right deployment portion located on the right of the upper and lower deployment portions, a left deployment portion located on the left of the upper and lower deployment portions, and a central deployment portion located between the upper, lower, right, and left deployment portions, wherein the method comprises: a first process of folding one of the lower deployment portion, the right deployment portion, and the left deployment portion on the occupant side of the central deployment portion; a second process of folding one of the right deployment portion and the left deployment portion on the occupant side of the folded deployment portions when the lower deployment portion is folded on the occupant side of the central deployment portion in the first process, or the lower deployment portion on the occupant side of the folded deployment portions when one of the right deployment portion and the left deployment portion is folded on the occupant side of the central portion in the first process; a third process of folding another of the right deployment portion and the left deployment portion on the occupant side of the deployment portions folded in the second process; and a fourth process of folding the upper deployment portion on the most occupant side of the deployment portions folded in the third process.

BRIEF DESCRIPTION OF THE DRAWINGS

The other objects and features of the present invention will become apparent from the following description with reference to the accompanying drawings, wherein:

FIGS. 4A-4G show a first process of an airbag folding method, wherein FIG. 4A is a front view showing an initial state of the airbag, FIGS. 4B-4F are front views showing states of the airbag subsequent to the initial state, and FIG. 4G is a sectional view taken along the line 4G-4G in FIG. 4F;

FIGS. 5A-5E show a second process of the airbag folding method, wherein FIG. 5A is a perspective view showing a state of the airbag subsequent to the state in FIG. 4F, and FIGS. 5B-5E are perspective views showing states of the airbag subsequent to the state in FIG. 5A;

FIGS. 6A-6F show a third process of the airbag folding method, wherein FIG. 6A is a perspective view showing a state of the airbag subsequent to the state in FIG. 5E, FIGS. 6B-6E are perspective views showing states of the airbag subsequent to FIG. 6A, and FIG. 6F is a sectional view taken along the line 6F-6F in FIG. 6E;

FIGS. 7A-7F show a fourth process of the airbag folding method, wherein FIG. 7A is a perspective view showing a state of the airbag subsequent to the state in FIG. 6E, FIGS. 7B-7E are perspective views showing states of the airbag subsequent to the state in FIG. 7A, and FIG. 7F is a sectional view taken along the line 7F-7F in FIG. 7E;

FIGS. 8A-8C show a second embodiment of the present invention, wherein FIG. 8A is a perspective view showing a state of the airbag subsequent to the state in FIG. 7B, FIG. 8B is a perspective view showing a state of the airbag subsequent of the state in FIG. 8A, and FIG. 8C is a sectional view taken along the line 8C-8C in FIG. 8B.

DETAILED DESCRIPTION OF THE INVENTION

Figure 1:
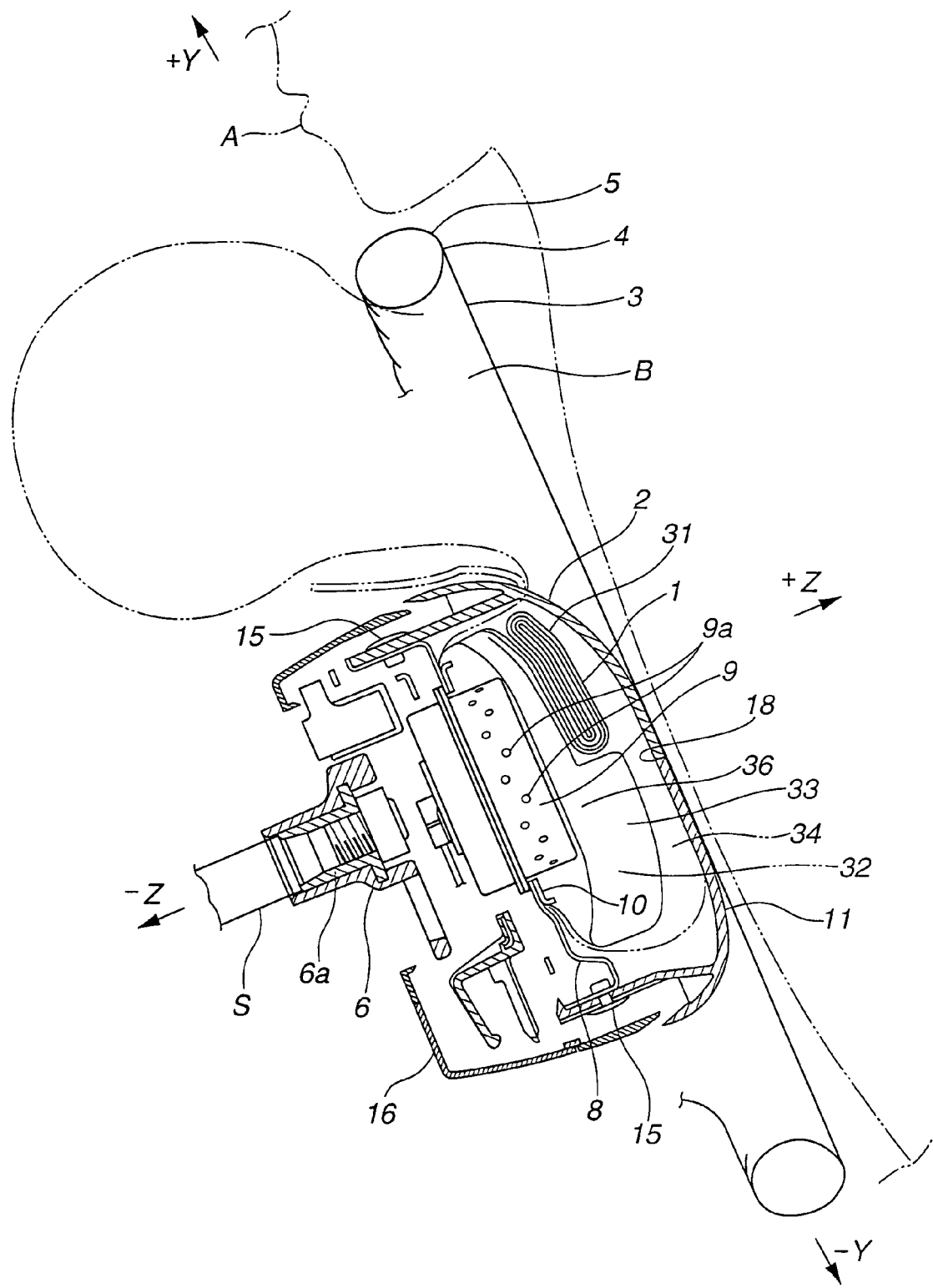
FIG. 1 is a sectional view showing a first embodiment of an airbag device having an airbag according to the present invention, wherein the airbag device is mounted to the steering wheel.

Referring to the drawings, a description will be made about the first embodiment of an airbag, an airbag folding method, and an airbag device according to the present invention.

Figure 2:
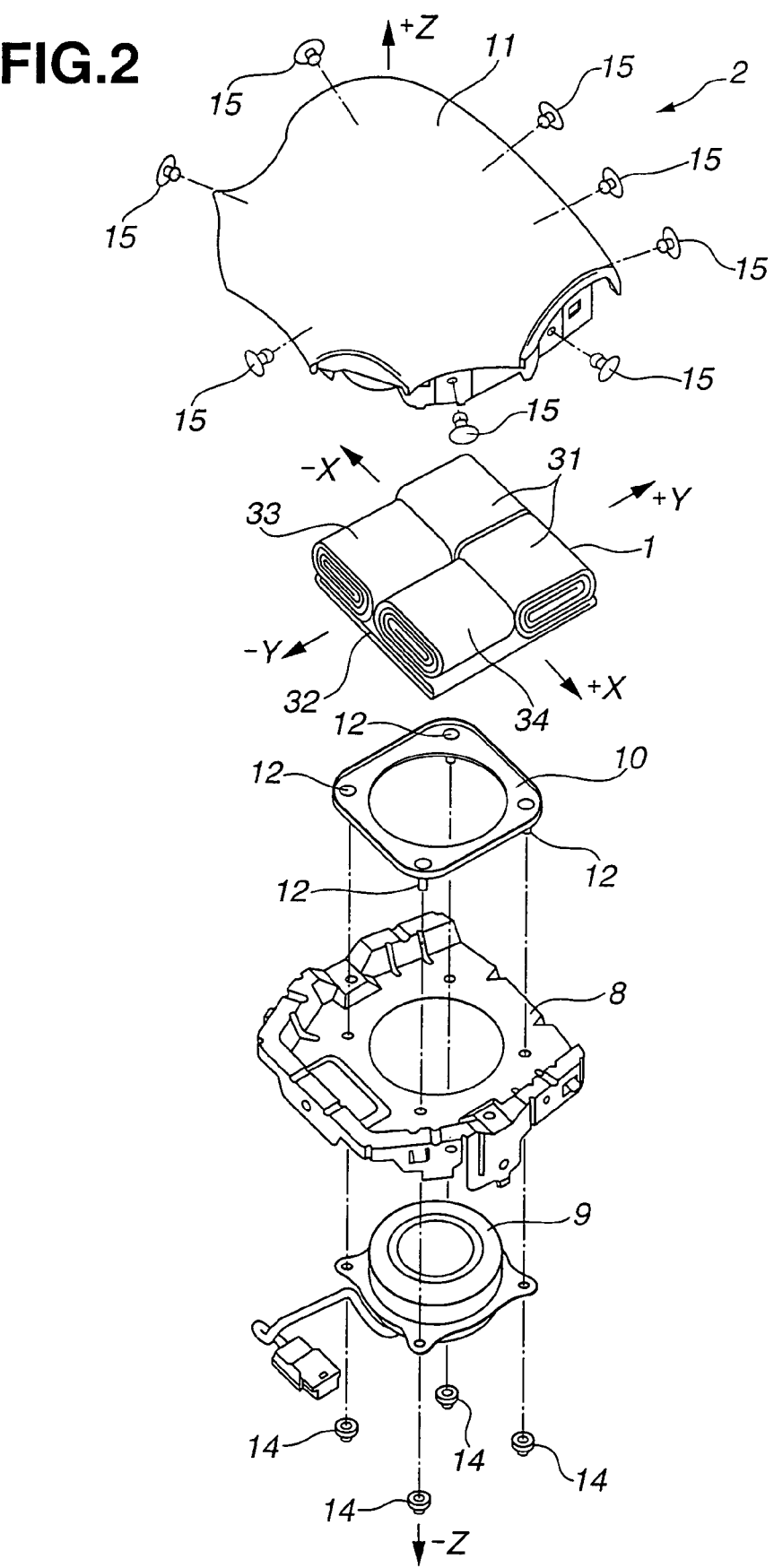
FIG. 2 is an exploded perspective view showing the airbag device.
Figure 3:
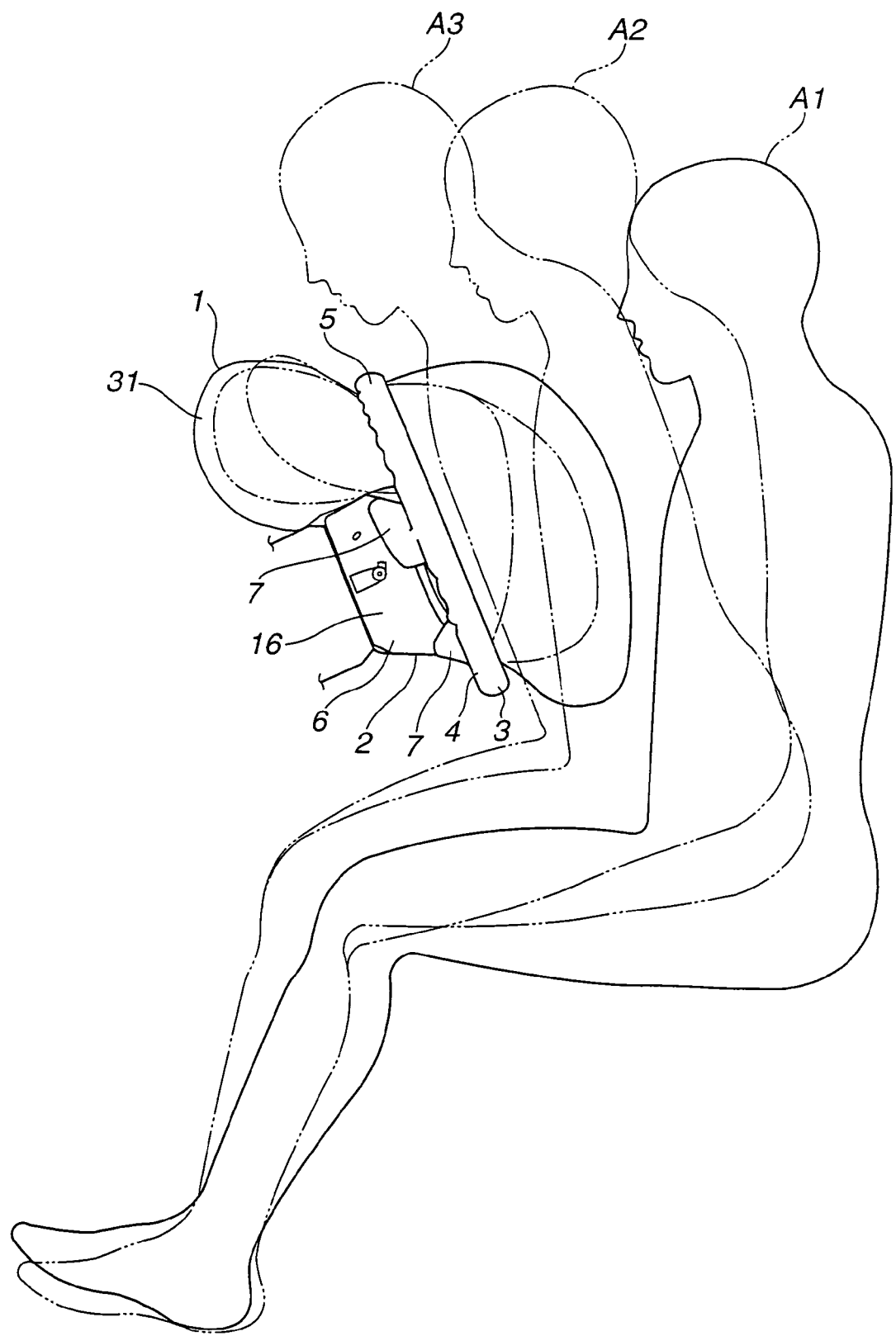
FIG. 3 is a schematic view showing operation of the first embodiment.

Referring to FIGS. 1-3, an airbag 1 is provided in an airbag device 2. The airbag device 2 referred also to as an airbag module is designed for driver's seat use, and is mounted to a steering-wheel main body 4 as a member to be mounted 4, which constitutes a steering wheel 3 of a motor vehicle. The airbag device 2 deploys in such a way as to conceal the passenger side of the steering-wheel main body 4, restraining from an impact such as collision an occupant or passenger A as an object to be restrained. Typically, the steering-wheel main body 4 is mounted to an inclined steering shaft S, and is applied in the inclined state. Referring to FIGS. 1 and 2, assuming that with the steering wheel 3 rotated in the position to allow straight-ahead driving of the vehicle, the upper rear side of the vehicle or front side of the airbag device 2 is occupant side (direction of arrow +Z), the lower front side of the vehicle or vehicle-body side corresponding to the back side of the airbag device 2 is counter-occupant side (direction of arrow −Z), the upper front side of the vehicle or front-glass side is upper side (direction of arrow +Y), and the lower rear side of the vehicle or frontward side of the occupant A is lower side (direction of arrow −Y), the first embodiment will be described. Moreover, referring to FIGS. 2 and 4A, the right horizontal side of the vehicle is right side (direction of arrow +X), the left horizontal side of the vehicle is left side (direction of arrow −X). In the drawings, the occupant A is shown by the shape of a dummy.

The steering-wheel main body 4 comprises an annular rim 5, a boss 6 located inside the rim 5, and a plurality of spokes 7 for connecting the rim 5 and the boss 6. The steering shaft S is engaged and fixed to a boss portion 6a of the boss 6. There are spaces between the rim 5, boss, 6, and spokes 7. Particularly, in order to allow visual recognition of meters on an instrument panel, a space B larger than other spaces is defined in a portion of the steering-wheel main body 4 located upward in the straight-ahead state.

The airbag device 2 comprises a base plate 8 forming a support member, the airbag 1 mounted to the base plate 8, an inflator or gas generator 9, a retainer or annular hardware 10, a synthetic-resin cover 11, and the like. The assembling process of the airbag device 2 is as follows. By way of example, with the retainer 10 inserted into the airbag 1, the airbag 1 is folded as will described later, and the airbag 1, retainer 10, and inflator 9 are fixed to the base plate 8 using bolts 12 protruding from the retainer 10 and a nut 14 engaged with the bolts 12. The folded airbag 1 is covered with the cover 11 which is fixed to the base plate 8 by a rivet 15 or the like. The airbag device 2 is mounted to the passenger side of the boss portion 6a by coupling the base plate 8 to the boss portion 6a using a bracket, not shown. The counter-passenger side of the boss 6 is covered with a rear cover 16 coupled to the boss portion 6a. A tear line or weak part 18 having roughly H shape in plan is formed with the cover 11.

When the motor vehicle provided with the airbag device 2 undergoes a collision impact, the inflator 9 is actuated by an electronic control unit (ECU), not shown, so that gas is quickly ejected into the airbag 1 from a gas ejection port 9a formed through the peripheral surface of the inflator 9. Then, by the expansion pressure, the airbag 1 breaks the cover 11 along the tear line 18 to form a projection opening. And, referring to FIG. 3, the airbag 1 expands and deploys in a predetermined shape through the projection opening to receive the occupant A who is inclining forward, relieving an impact applied to the occupant A.

Referring next to FIGS. 1-7F, the structure of the airbag 1 and its folding method will be described in detail.

The airbag 1 comprises an occupant-side base cloth (face panel) 21 which is a portion facing the occupant A (occupant-side face), and a counter-occupant-side base cloth (rear panel) 22 which is a counter-occupant-side face opposite to the occupant-side base cloth 21. The two base cloths 21, 22 are circular base cloths of roughly the same shape, and are formed like a flat bag by sewing the peripheral edges together. A circular gas introduction port 24 is formed in the center of the counter-occupant-side base cloth 22 to receive the inflator 9, and a pair of vent holes (exhaust port) 25 are arranged above the gas introduction port 24. A plurality of mounting holes, not shown, for receiving the bolts 12 of the retainer 10 are formed around the gas introduction port 24, and a reinforcing cloth, not shown, is mounted thereinaround.

Next, the process of folding the airbag 1 will be described.

Referring to FIGS. 4A-F, the folding process includes first to fourth steps wherein the upper/lower and right/left portions of the airbag 1 are superimposed one upon another on the passenger side of the center thereof.

Specifically, as shown in FIG. 4A, with the occupant-side base cloth 21 placed up, the airbag 1, having a circular shape, is disposed on a flat work table in a plate-like way, in an unfolded manner. In this state, two straight lines which intersect at a center O form horizontal reference axes X and vertical reference axes Y which define right/left and upward/downward directions and four quadrants consisting of an upper right quadrant, an upper left quadrant, a lower right quadrant and a lower left quadrant. As for the neighborhood of points of intersection of the reference axes X, Y and the outer periphery of the airbag 1, there are defined an upper deployment portion 31 consisting of the upper right and upper left quadrants and corresponding to the head of the occupant A; a lower deployment portion 32 consisting of the lower right and lower left quadrants and which is an expansion portion corresponding to at least the chest of the occupant A below the head (in the first embodiment, a body portion from the chest to the abdomen); a left deployment portion 33 consisting of the upper left and lower left quadrants and located on the left side of the upper and lower deployment portions 31, 32; a right deployment portion 34 consisting of the upper right and lower right quadrants and located on the right side of the upper and lower deployment portions 31, 32; and a central deployment portion 36 located between the deployment portions 31-34, that is, at the intersection of the upper, lower, right and left deployment portions over the center O.

In the first embodiment, as shown in FIGS. 4B-4G, the first process is a process of folding the lower deployment portion 32 to the occupant side of the central deployment portion 36. First, as shown in FIG. 4B, the lower deployment portion 32 is folded on the central deployment portion 36 along a predetermined first folding line 32a set close to the gas introduction port 24. Then, as shown in FIGS. 4C-4G, the lower deployment portion 32 is folded from the outer peripheral end on the occupant side of the central deployment portion 36 along predetermined folding lines 32b, 32c, 32d, 32e in a winding way. Specifically, the lower deployment portion 32 is wound four times in a roll on the occupant side of the central deployment portion 36, forming a lower-deployment-portion folded body.

Figure 5A:
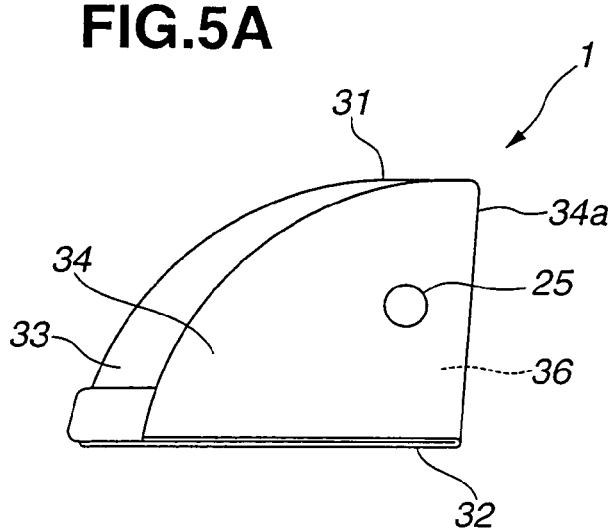
Figure 5D:
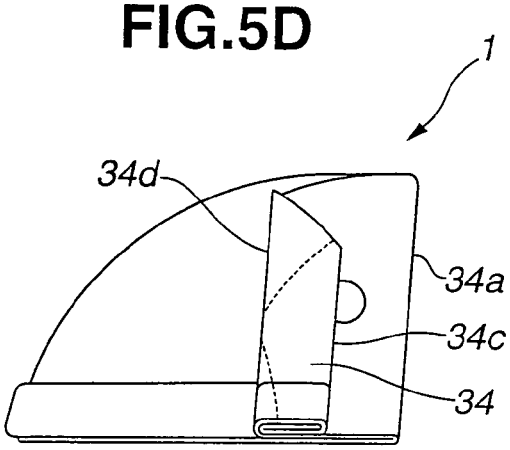
Figure 5B:
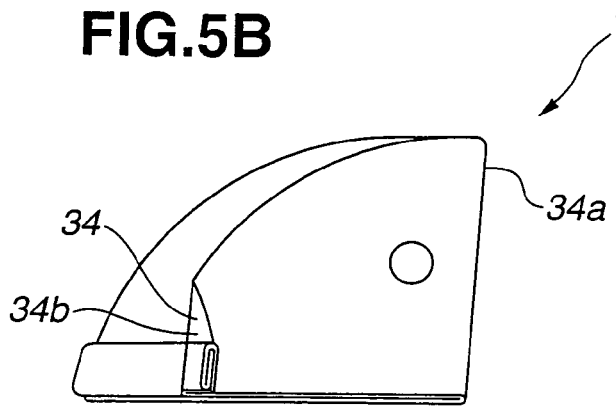
Figure 5E:
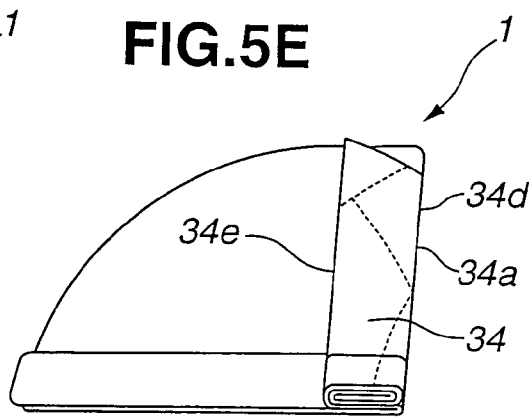
Figure 5C:
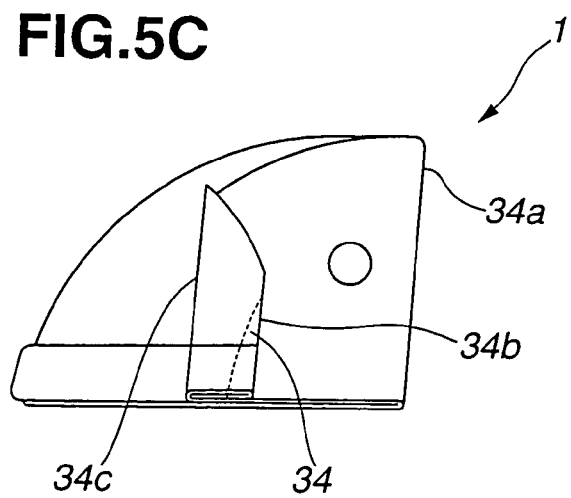

In the first embodiment, as shown in FIGS. 5A-5E, the second process is a process of folding the right deployment portion 34 to the occupant side of the central deployment portion 36 and folded lower deployment portion 32. First, as shown in FIG. 5A, the right deployment portion 34 is folded on the central deployment portion 36 along a predetermined first folding line 34a set close to the gas introduction port 24. Then, as shown in FIGS. 5B-5E, the right deployment portion 34 is folded from the outer peripheral end on the occupant side of the central deployment portion 36 along predetermined folding lines 34b, 34c, 34d, 34e in a winding way. Specifically, the right deployment portion 34 is wound four times in a roll on the occupant side of the central deployment portion 36, forming a right-deployment-portion folded body.

In the first embodiment, as shown in FIGS. 6A-6F, the third process is a process of folding the left deployment portion 33 to the occupant side of the central deployment portion 36 and folded upper deployment portion 31. First, as shown in FIG. 6A, the left deployment portion 33 is folded on the central deployment portion 36 along a predetermined first folding line 33a set close to the gas introduction port 24. Then, as shown in FIGS. 6B-6F, the left deployment portion 33 is folded from the outer peripheral end on the occupant side of the central deployment portion 36 along predetermined folding lines 33b, 33c, 33d, 33e in a winding way. Specifically, the left deployment portion 33 is wound four times in a roll on the occupant side of the central deployment portion 36, forming a left-deployment-portion folded body.

Figure 7A:
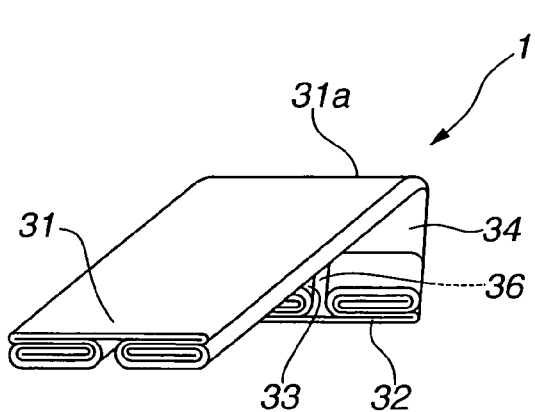
Figure 7B:
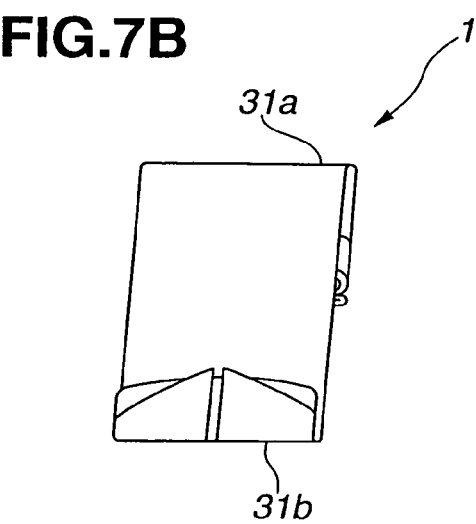
Figure 7C:
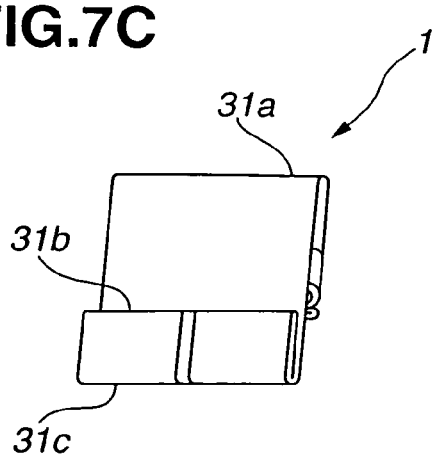
Figure 7D:
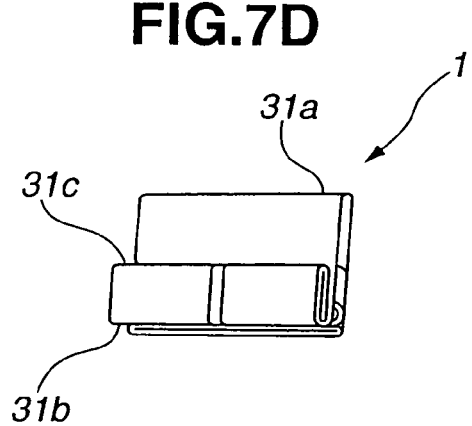
Figure 7E:
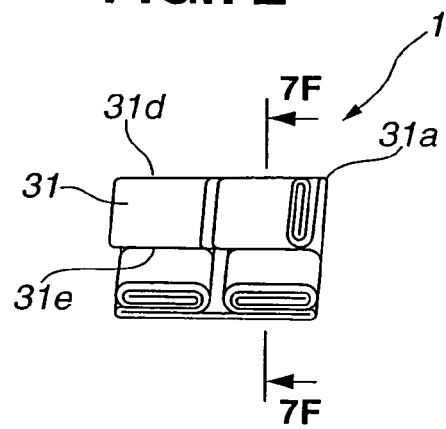
Figure 7F:
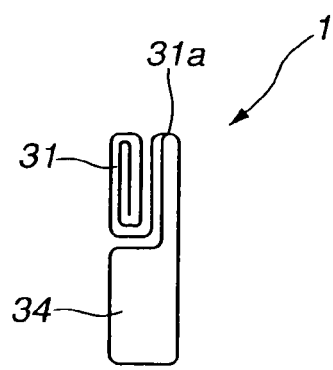

In the first embodiment, as shown in FIGS. 7A-7F, the fourth process is a process of folding the upper deployment portion 31 to the occupant side of the central deployment portion 36, folded lower deployment portion 32, right deployment portion 34, and left deployment portion 33. First, as shown in FIG. 7A, the upper deployment portion 31 is folded on the central deployment portion 36 along a predetermined first folding line 31a set close to the gas introduction port 24. Then, as shown in FIGS. 7B-7F, the upper deployment portion 31 is folded from the outer peripheral end on the occupant side of the central deployment portion 36 along predetermined folding lines 31b, 31c, 31d, 31e in a winding way. Specifically, the upper deployment portion 31 is wound four times in a roll on the occupant side of the central deployment portion 36, forming an upper-deployment-portion folded body.

In this state, as shown in FIGS. 1 and 2, the lower deployment portion 32, right deployment portion 34 and left deployment portion 33 are superimposed on the occupant side of the central deployment portion 36 to form a lower folded body. Further, the upper deployment portion 31 is superimposed on the most occupant side of the folded deployment portions 33, 34, 36 and the upper side (direction of arrow +Y) of the folded right deployment portion 34 and left deployment portion 33. The upper side is the side in the direction +Y of the reference axisx.

Specifically, in the first embodiment, the occupant-side base cloth 21 of the airbag 1 is partitioned into upper/lower and right/left areas with respect to the central deployment portion 36. In the first to third processes, without folding the upper deployment portion 31, the lower deployment portion 32, right deployment portion 34, and left deployment portion 33 are folded into the lower folded body, and the upper deployment portion 31 is superimposed on the most occupant side of the folded deployment portions 33, 34, 36 and the upper side of folded right deployment portion 34 and left deployment portion 33, in the final process or fourth process.

Thus, in the first embodiment, when supplying gas to the airbag 1, the upper deployment portion 31 expands and deploys first. In the case that the occupant A occupies an ordinary riding position, i.e. he/she is seated in a normal seat position, as shown by a solid line A1 in FIG. 3, the airbag 1 expands and deploys to provide more quickly a greater volume toward a space facing the head of the occupant A before the occupant A inclines forward from the position as shown by a two-dot chain line A2 to the position as shown by a two-dot chain line A3, thus supporting the head, allowing sure restraint of the occupant A.

During deployment, at the initial stage of deployment, the deployment portions 31, 32, 33, 34 deploy in such a way as to rotate with the first folding lines 31a, 32a, 33a, 34a as fulcrum, providing a roll wound on the counter-occupant side, allowing achievement of flat and wide deployment along the substantial plane including the rim 5 of the member to be mounted or steering wheel 3.

On the other hand, in the case that the occupant A is seated close to the steering wheel 3, e.g. the upper body of the occupant A covers the whole of the rim 5 of the steering wheel 3 as shown in FIG. 1 and by two-dot chain line A3 in FIG. 3, when the upper deployment portion 31 which expands and deploys first comes in contact with the body of the occupant A, it expands and deploys in such a way as to escape forward of the vehicle through a space B defined between the upper portion of the rim 5 of the steering wheel 3 and the airbag device 2 and having less resistance. Then, the folded bodies of the left deployment portion 33 and right deployment portion 34 expand and deploy, which is followed finally by expansion and deployment of the folded body of the lower deployment portion 32, allowing restraint of a force of the airbag 1 to press the occupant A backward.

Further, the upper deployment portion 31 which deploys first rotates with the first folding line 31a as axis, and then expands and deploys in such a way as to be rewound to the counter-occupant side, allowing achievement of deployment of the airbag 1 in such a way as to smoothly enter the space B with the occupant A being seated close to the steering wheel 3.

Still further, without directly superimposing the upper deployment portion 31 on the lower deployment portion 32 for folding, the third process is absolutely carried out with one of the right deployment portion 34 and the left deployment portion 33, allowing reinforcement of the effect that expansion is ensured toward the head to allow restraint thereof, subsequently, toward the chest and abdomen below the head.

Furthermore, the folding operation is easy to carry out. Both manual folding and machine folding can achieve simplified process, resulting in a reduction in manufacturing cost.

Figure 8A:
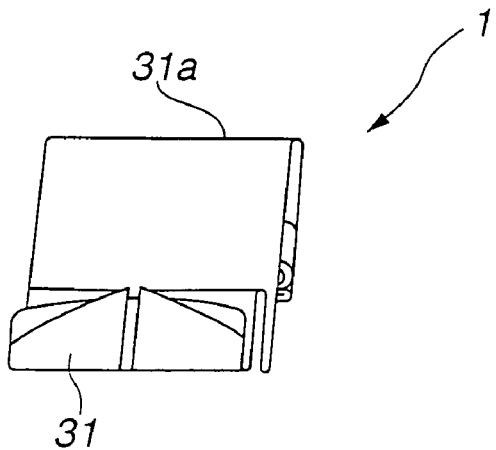
Figure 8B:
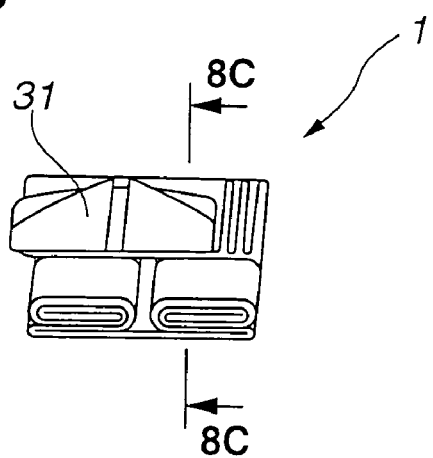
Figure 8C:
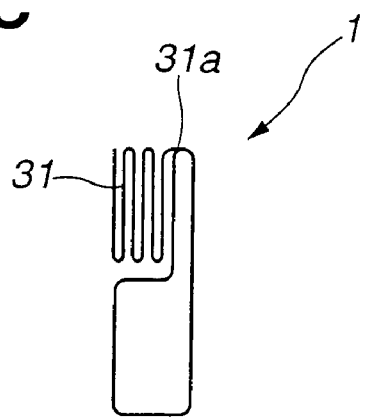
Figure 9:
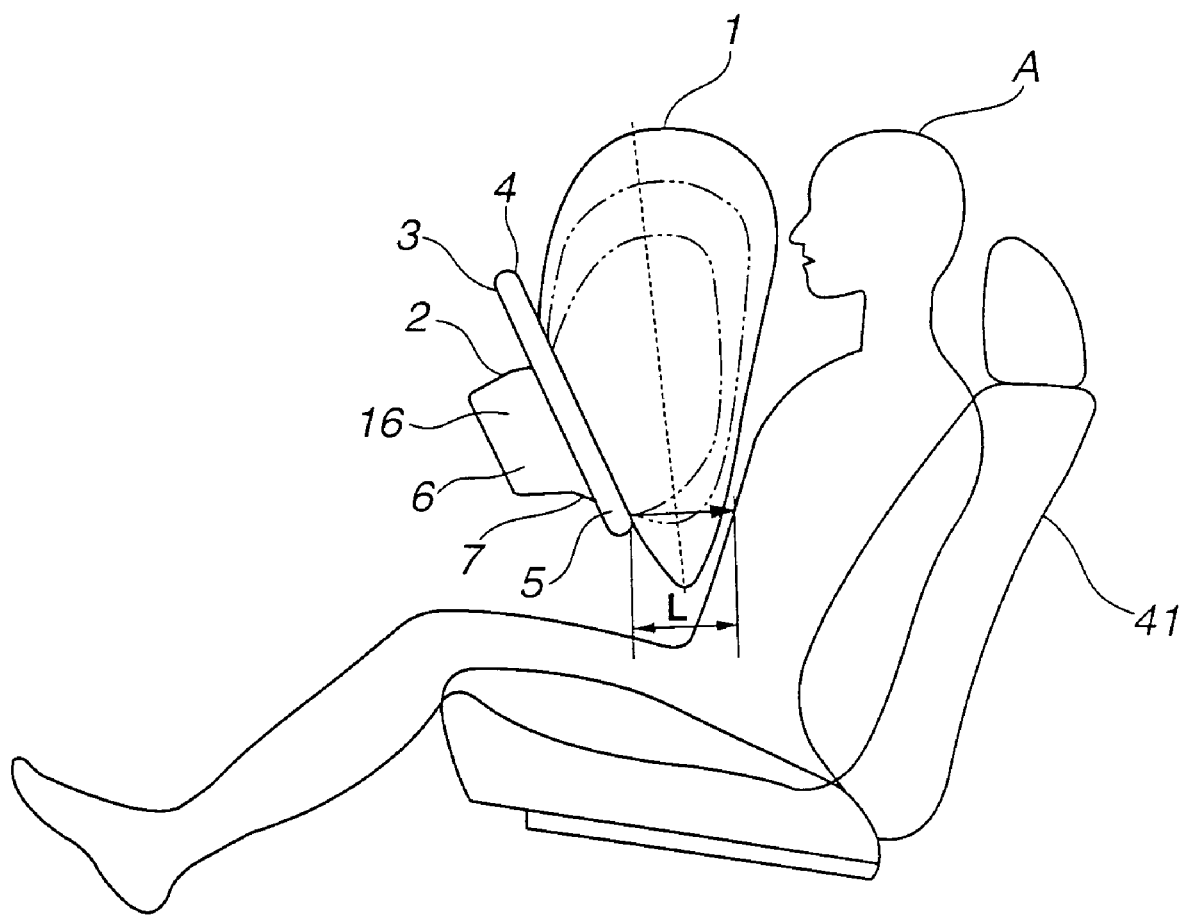
FIG. 9 is a view similar to FIG. 3, showing operation of the second embodiment.

Referring next to FIGS. 8A-9, the second embodiment of the present invention will be described.

The second embodiment is substantially the same as the first embodiment except the folding method of the upper deployment portion 31 which is folded last. Specifically, the folding method of the airbag 1 is the same in step from FIG. 4A to FIG. 7B wherein the lower deployment portion 32 and the left and right deployment portions 33, 34 are folded in the same way as in the first embodiment, forming folded bodies. In the second embodiment, the upper deployment portion 31 is not folded in a roll, but is folded five times in a bellows from the edge as shown in FIGS. 8A-8C, forming a folded body of the upper deployment portion 31. Note that FIG. 9 shows an automotive sheet 41.

In the second embodiment, the upper deployment portion 31 is folded in a bellows, allowing instantaneous upward deployment of the airbag 1 at the initial stage of deployment as shown in FIG. 9. And as shown in FIG. 9, the airbag 1 expands and deploys in a longitudinal shape, i.e. with the contact surface of the airbag 1 with the occupant A being maintained in the vertical state as viewed from the side. Then, the airbag 1 has deployment direction restrained by the head and chest of the occupant A. And the lower deployment portion 32 deploys in such a way as to slip into a space defined on the abdomen side, i.e. a narrow range L between the rim 5 of the steering wheel 3 and the abdomen of the occupant A. This results in deployment of the airbag 1 between the steering wheel 3 and the occupant A, allowing enhancement in occupant restraint performance of the airbag 1.

In the illustrative embodiments, the number of foldings of the deployment portions 31, 32, 33, 34 can be selected as required in accordance with the size of the airbag 1.

Further, in the illustrative embodiments, the first to third processes are involved in the lower deployment portion 32, right deployment portion 34, and left deployment portion 33, respectively. Optionally, they can be involved in the right deployment portion 34, lower deployment portion 32, and left deployment portion 33, or the left deployment portion 33, lower deployment portion 32, and right deployment portion 34.

Furthermore, in the illustrative embodiments, when being folded, the right deployment portion 34 and left deployment portion 33 are disposed side by side. Optionally, they can be disposed in such a way as to superimpose one on the occupant side of another.

The airbag of the present invention can be applied not only to a driver-side airbag mounted to a steering-wheel main body, but also a passenger-side airbag provided to an instrument panel and a rear-seat airbag provided to a rear seat. Moreover, the airbag of the present invention can be adopted as an airbag for absorbing an impact applied to an occupant.

According to the present invention, when the airbag device including airbag is actuated to supply gas into the airbag for deployment, first, the upper deployment portion folded on the most occupant side and upper side of the folded deployment portions deploys quickly toward a space corresponding to the head of the occupant. Then, the airbag can deploy largely toward a space corresponding to the head of the occupant.

Further, the upper deployment portion is not directly superimposed on the lower deployment portion, allowing, at the initial stage of deployment, reinforcement of the effect that expansion is ensured toward the head to allow restraint thereof, subsequently, toward the chest and abdomen below the head.

Still further, since the upper deployment portion is wound in the optional direction, it can deploy in the predetermined direction while being rewound during deployment of the airbag.

Furthermore, since the upper deployment portion is folded in a bellows, it can quickly deploy during deployment of the airbag.

Further, according to the present invention, when the airbag folded in accordance with the airbag folding method is actuated to supply gas into the airbag, first, the upper deployment portion deploys quickly toward a space corresponding to the head of the occupant. Thus, the airbag can deploy largely toward a space corresponding to the head of the occupant before he/she inclines forward. Moreover, the upper deployment portion is not directly superimposed on the lower deployment portion, allowing, at the initial stage of deployment, reinforcement of the effect that expansion is ensured toward the head to allow restraint thereof, subsequently, toward the chest and abdomen below the head.

Still further, the airbag deploys to cover the side of an object to be restrained of a mounting member, thus restraining the object. A portion which deploys at the initial stage of deployment deploys toward a space, so that when the object is close to the airbag device, the portion deploys to slip into the space, achieving easy alleviation of a force of the airbag to be applied to the occupant.

Furthermore, when the occupant is seated close to the airbag device, a force of the airbag to be applied to the occupant can be alleviated easily.

Having described the present invention in connection with the illustrative embodiments, it is noted that the present invention is not limited thereto, and various changes and modifications can be made without departing from the scope of the present invention.

The entire teachings of Japanese Patent Application P2004-051333 filed Feb. 26, 2004 are hereby incorporated by reference.

What is claimed is:

1. An airbag disposed in an airbag device, comprising:
the airbag having a circular shape when unfolded in a flat manner, and two straight lines which intersect at a center O of the airbag form horizontal reference axis X and vertical reference axis Y which define four quadrants consisting of an upper right quadrant, an upper left quadrant, a lower right quadrant and a lower left quadrant,
an upper deployment portion consisting of the upper right and upper left quadrants and corresponding to a head of an occupant;
a lower deployment portion consisting of the lower right and lower left quadrants and corresponding to a body of the occupant below the head;
a right deployment portion consisting of the upper right and lower right quadrants and located on the right of the upper and lower deployment portions;
a left deployment portion consisting of the upper left and lower left quadrants and located on the left of the upper and lower deployment portions; and
a central deployment portion located at the intersection of the upper, lower, right, and left deployment portions over the center O,
the lower deployment portion, the right deployment portion, and the left deployment portion being folded on an occupant side of the central deployment portion in an optional order to form a lower folded body comprising an entire area of the lower right and lower left quadrants, wherein at least one of the right deployment portion and the left deployment portion is folded on the most occupant side of the folded lower deployment portion,
the upper deployment portion being folded to be superimposed on the most occupant side of an upper side of the folded right and left deployment portions and not superimposed on the lower folded body so that the lower deployment portion is restrained from deploying before the upper deployment portion.

2. The airbag as claimed in claim 1, wherein the optional order is set so that the lower deployment portion fails to be located on the most occupant side.

3. The airbag as claimed in claim 1, wherein the upper deployment portion includes at least part wound in a roll.

4. The airbag as claimed in claim 1, wherein the upper deployment portion includes at least part folded in a bellows.

5. A method of folding an airbag, the airbag having a circular shape when unfolded in a flat manner, and two straight lines which intersect at a center O of the airbag form horizontal reference axis X and vertical reference axis Y which define four quadrants consisting of an upper right quadrant, an upper left quadrant, a lower right quadrant and a lower left quadrant, the airbag further including an upper deployment portion consisting of the upper right and upper left quadrants and corresponding to a head of an occupant, a lower deployment portion consisting of the lower left and lower right quadrants and corresponding to a body of the occupant below the head, a right deployment portion consisting of the upper right and lower right quadrants and located on the right of the upper and lower deployment portions, a left deployment portion consisting of the upper left and lower left quadrants and located on the left of the upper and lower deployment portions, and a central deployment portion located at the intersection of the upper, lower, right, and left deployment portions, over the center O, the method comprising:

a first process of folding one of the lower deployment portion, the right deployment portion, and the left deployment portion on the occupant side of the central deployment portion;

a second process of folding one of the right deployment portion and the left deployment portion on the occupant side of the folded deployment portions when the lower deployment portion is folded on the occupant side of the central deployment portion in the first process, or the lower deployment portion on the occupant side of the folded deployment portions when one of the right deployment portion and the left deployment portion is folded on the occupant side of the central portion in the first process;

a third process of folding another of the right deployment portion and the left deployment portion on the occupant side of the deployment portions folded in the second process; and a fourth process of folding the upper deployment portion on the most occupant side of the deployment portions folded in the third process, wherein the upper deployment portion is not superimposed over the lower deployment portion and deploys before the lower deployment portion.

* * * * *